United States Patent
Hsueh

(10) Patent No.: US 7,774,518 B2
(45) Date of Patent: Aug. 10, 2010

(54) METHOD FOR SWITCHING OF KVM SWITCH PORTS AND RELATED DEVICE

(75) Inventor: Chao-Hsuan Hsueh, Taipei (TW)

(73) Assignee: Aten International Co., Ltd. (TW)

( * ) Notice: Subject to any disclaimer, the term of this patent is extended or adjusted under 35 U.S.C. 154(b) by 65 days.

(21) Appl. No.: 11/857,507

(22) Filed: Sep. 19, 2007

(65) Prior Publication Data

US 2009/0077282 A1   Mar. 19, 2009

(51) Int. Cl.
- G06F 3/00 (2006.01)
- G06F 13/12 (2006.01)
- G06F 13/38 (2006.01)

(52) U.S. Cl. .............................. 710/36; 710/38; 710/62; 710/72

(58) Field of Classification Search ................... 710/36, 710/38, 62, 72
See application file for complete search history.

(56) References Cited

U.S. PATENT DOCUMENTS

| | | | |
|---|---|---|---|
| 6,304,895 B1 | 10/2001 | Schneider et al. | |
| 6,539,418 B2 | 3/2003 | Schneider et al. | |
| 6,633,905 B1 | 10/2003 | Anderson et al. | |
| 6,880,002 B2 | 4/2005 | Hirschfeld et al. | |
| 7,028,110 B2 | 4/2006 | Seki et al. | |
| 7,114,018 B1 | 9/2006 | Maity et al. | |
| 7,136,946 B2 | 11/2006 | Shirley | |
| 7,240,111 B2 | 7/2007 | VanHarlingen et al. | |
| 7,246,183 B2 | 7/2007 | Covington et al. | |
| 7,260,624 B2 | 8/2007 | Sivertsen | |
| 2006/0230110 A1 | 10/2006 | VanHarlingen et al. | |
| 2008/0282003 A1* | 11/2008 | Holovacs et al. | ............. 710/72 |

OTHER PUBLICATIONS

APC Analog KVM switch and APC Analog KVM Console Extender Manual, Apr. 2005, American Power Conversion, pp. 14-15.*

Mouse gestures—definition, http://www.mousegestures.org, pp. 1-2.*

* cited by examiner

*Primary Examiner*—Niketa I Patel
*Assistant Examiner*—David E Martinez
(74) *Attorney, Agent, or Firm*—Chen Yoshimura LLP

(57) ABSTRACT

A method for switching KVM switch ports comprising a plurality of computer ports and a related device are provided. A behavior of a mouse coupled to the KVM switch is detected. The behavior comprises multiple click on a specific button of the mouse. In response to the behavior, the computer ports are switched accordingly.

21 Claims, 8 Drawing Sheets

METHOD FOR SWITCHING OF KVM SWITCH PORTS AND RELATED DEVICE

BACKGROUND OF THE INVENTION

1. Field of the Invention

The disclosure relates generally to a method for switching of KVM (Keyboard, Video and Mouse) switch ports, and, more particularly to a method for switching of KVM switch ports based on mouse behavior and a related device.

2. Description of the Related Art

A KVM switch is a hardware device that allows a user to control multiple hosts such as computers from a keyboard, video monitor and mouse. The KVM switch has a plurality of computer ports, each connecting to one of the hosts. At one time, one host can be selected and controlled. The KVM switch will pass signals between the hosts and the keyboard, video monitor and mouse depending on the currently selected host.

Conventionally, the computer ports of connected hosts are switched from one to another by the use of an external switch or buttons on the KVM switch. Some KVM switches also allow computer ports to be switched through keyboard commands. However, conventional methods for switching ports calls for additional hardware design and costs. Additionally, the operation for switching ports via keyboard commands require specific techniques, which are inconvenient and complicated for users. There is a need to provide simple and convenient mechanisms for switching of KVM switch ports.

BRIEF SUMMARY OF THE INVENTION

A method for switching of KVM switch ports and a related device are provided.

In an embodiment of a method for switching of KVM switch ports comprising a plurality of computer ports, a behavior of a mouse coupled to the KVM switch is detected. The behavior comprises multiple click on a specific button of the mouse. In response to the behavior, the computer ports are switched accordingly.

An embodiment of a KVM switch coupled with a mouse comprises a plurality of computer ports, and a processing module. The processing module detects a behavior of the mouse, wherein the behavior comprises multiple click on a specific button of the mouse. In response to the behavior, the processing module switches the computer ports accordingly.

An embodiment of a mouse coupled to a KVM switch comprising a plurality of computer ports comprises a specific button and a controller. The controller generates at least one signal in response to a behavior of the mouse, and transmits the signal to the KVM switch. The behavior comprises multiple click on the specific button. The KVM switch detects the behavior of the mouse according to the signal, and in response to the behavior, switches the computer ports accordingly.

Methods for switching of KVM switch ports and related devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

A method for switching of KVM switch ports and a related device are provided.

Figure 1:
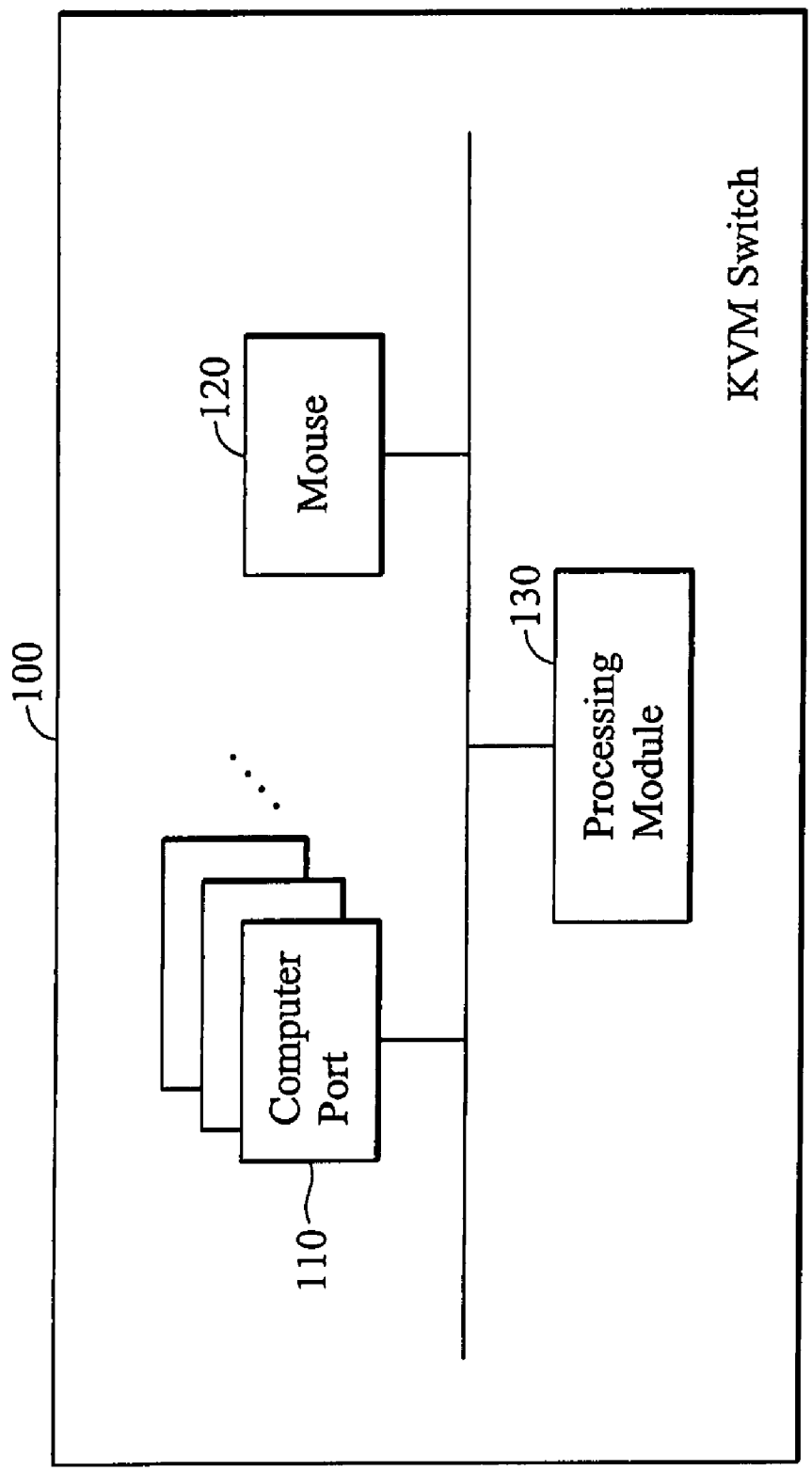
FIG. 1 is a schematic diagram illustrating a KVM switch according to an embodiment of the invention.

FIG. 1 is a schematic diagram illustrating a KVM switch according to an embodiment of the invention.

Figure 2:
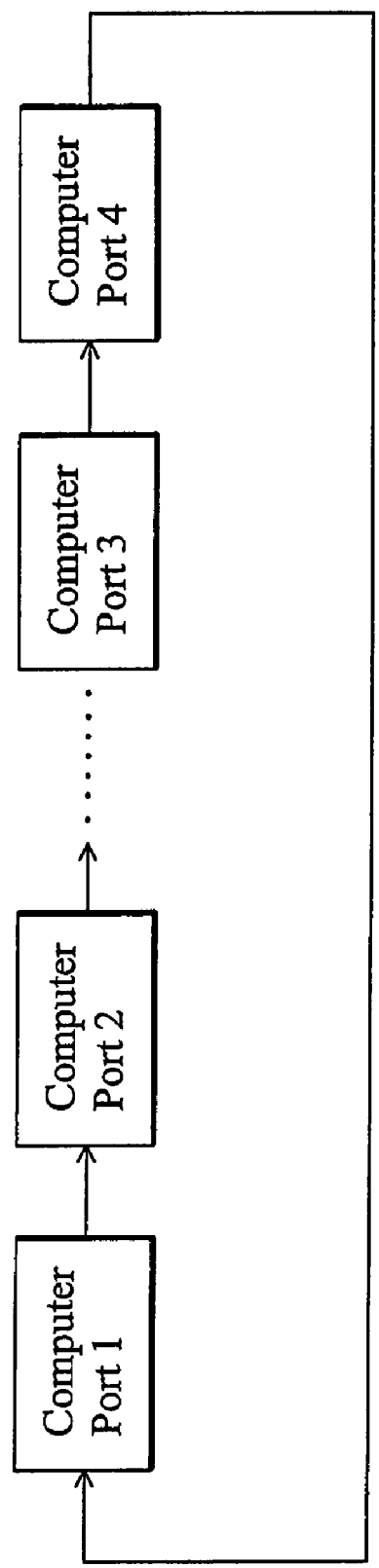
FIG. 2 is a schematic diagram illustrating an arrangement of computer ports according to an embodiment of the invention.
Figure 3:
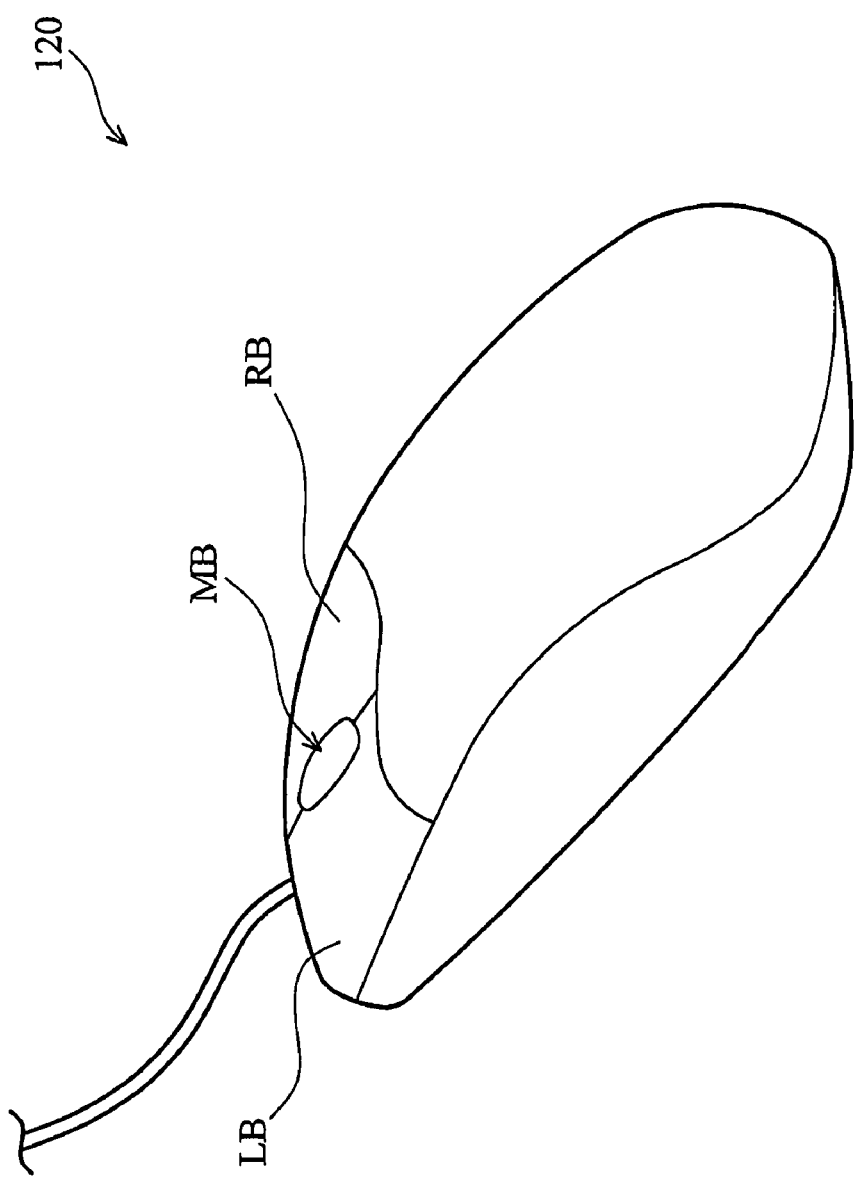
FIG. 3 is a schematic diagram illustrating a mouse according to an embodiment of the invention.
Figure 4:
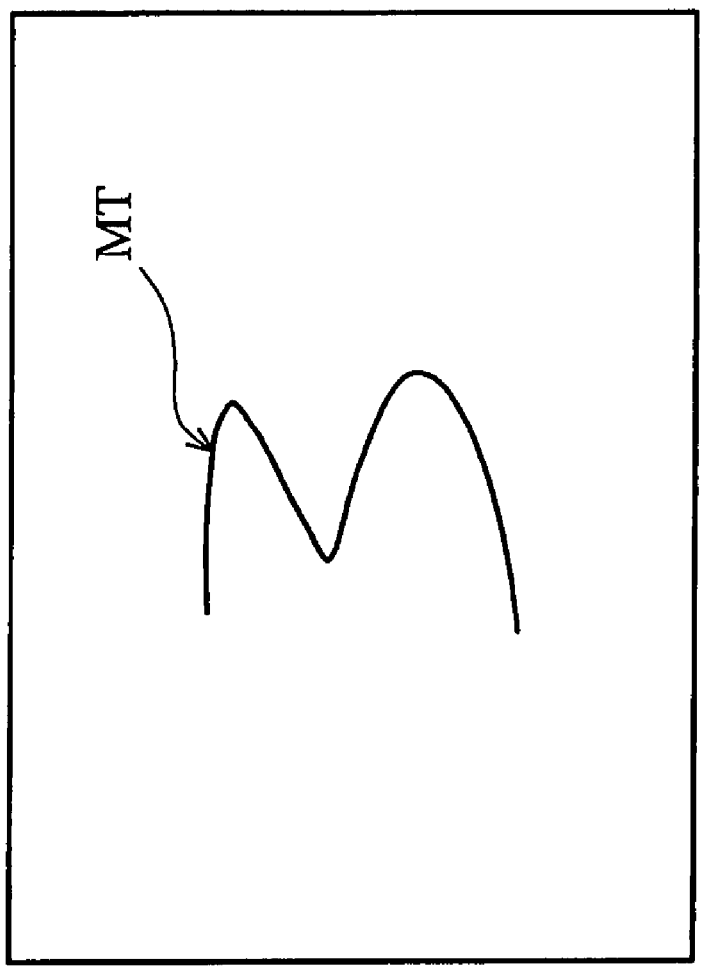
FIG. 4 shows an example of a movement trail of a mouse.

As shown in FIG. 1, the KVM switch 100 comprises a plurality of computer ports 110, a mouse 120, and a processing module 130. Each computer port connects to a host such as a computer, and receives and transmits signals therefrom. The mouse 120 may be a device of a console connected to the KVM switch 100. The console further includes a keyboard and a monitor. The console may control a computer connected to the computer port 110 via the KVM switch 100. In this embodiment, the computer ports are arranged in a circular order. That is one computer port follows another, and the first computer port is a next computer port of the last computer port. For example, computer port 2 is subsequent to computer port 1, computer port 4 is subsequent to computer port 3, and computer port 1 is subsequent computer port 4, as shown in FIG. 2. The reason for the special arrangement of computer ports is discussed later. The mouse 120 is a switch device for switching the KVM switch 100 ports. FIG. 3 is a schematic diagram illustrating a mouse according to an embodiment of the invention. The mouse 120 comprises a left button LB, a right button RB, and a mid-button MB. In some embodiments, the mid-button MB may be integrated with a scroll wheel function. It is understood that the mouse 120 comprises a controller (not shown) to generate and transmit signals corresponding to mouse behaviors, such as one click of a specific button, multiple click such as double click or more click on a specific button, movement trail of the mouse, and others to the processing module 130 of the KVM switch 100. FIG. 4 shows an example of a movement trail of a mouse. The controller of the mouse 120 will transmit position data (coordinates) corresponding to the movement trail MT to the processing module 130 of the KVM switch 100, and the processing module 130 will recognize the movement trail MT to obtain a specific number. For example, the movement trail MT in FIG. 4 can be recognized as "3". The processing module 130 controls related components of the KVM switch 100, and perform the methods for switching ports. It is understood that the KVM switch 100 may further comprise a keyboard, a video monitor, a storage unit, and other components.

Figure 5:
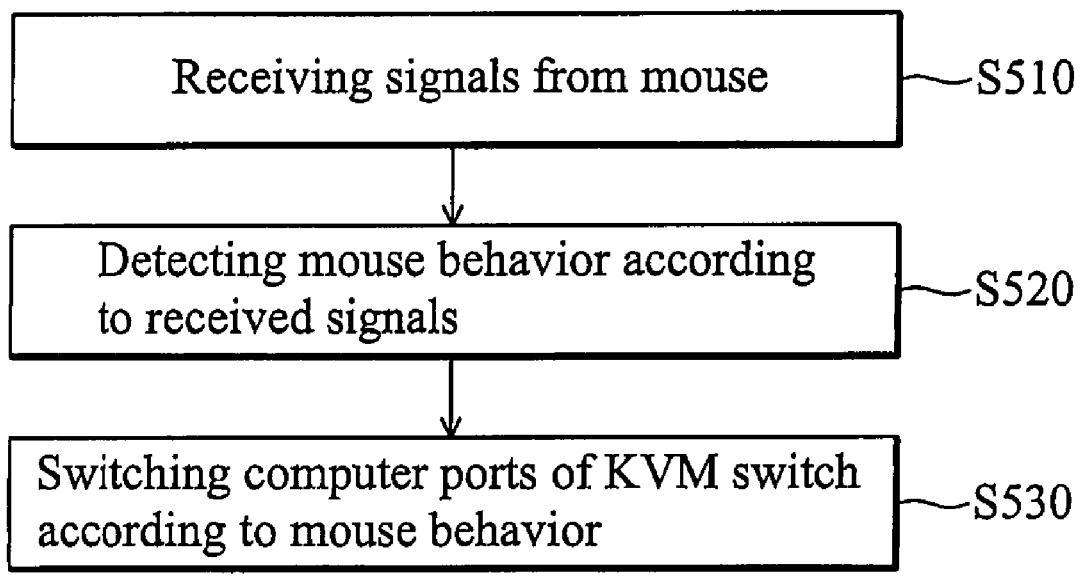
FIG. 5 is a flowchart of a method for switching of KVM switch ports according to an embodiment of the invention.

FIG. 5 is a flowchart of a method for switching KVM switch ports according to an embodiment of the invention. In step S510, signals are received from the mouse. In step S520, a mouse behavior is detected according to the received signals. In step S530, the computer ports of the KVM switch are switched according to the mouse behavior. It is understood that the mouse behavior can vary, and is not limited in any way. A more detailed description of types of mouse behaviors for switching computer ports is provided in later paragraphs.

Figure 6:
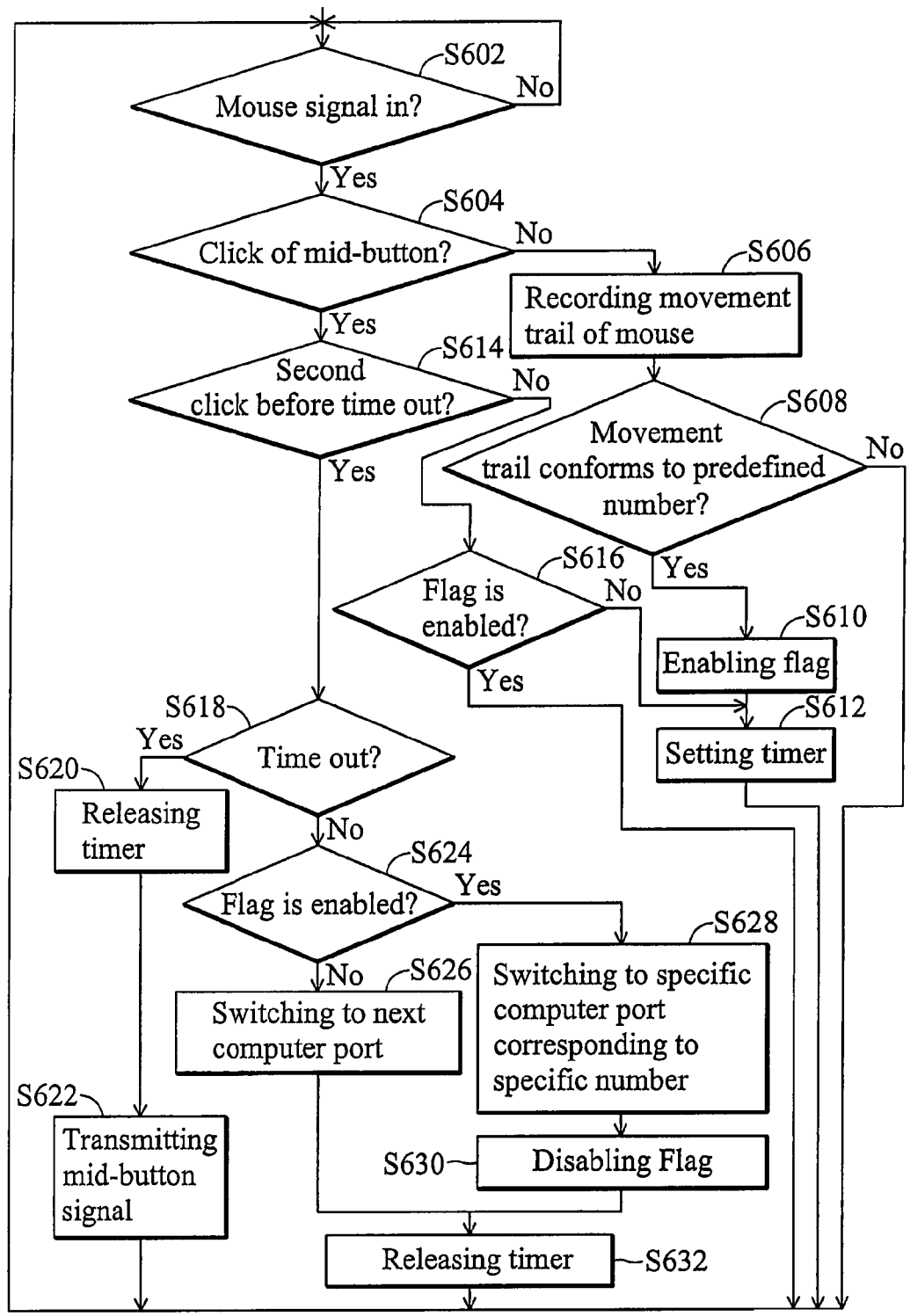
FIG. 6 is a flowchart of a method for switching of KVM switch ports according to an embodiment of the invention.

FIG. 6 is a flowchart of a method for switching KVM switch ports according to an embodiment of the invention. In this embodiment, two kinds of computer port switches are disclosed, wherein a flag can be used to determine which one is employed. First, a next computer port subsequent to a current computer port among the computer ports is switched to, in response to multiple click of a specific button of the mouse when the flag is disabled. It is understood that the multiple click may be double, triple or more click, and the specific button of the mouse may be any button of the mouse such as the mid-button, the left-button, the right-button of the mouse, or an extra button of the mouse other than the left-button, right-button and mid-button of the mouse. Second, a movement trail is recognized to obtain a specific number, and a specific computer port corresponding to the specific number is switched to, in response to multiple click when the flag is enabled. It is noted that, in this embodiment, the multiple click may be a double click, and the specific button may be the mid-button of the mouse.

In step S602, it is determined whether any mouse signal is received. If not (No in step S602), the procedure remains at step S602. If so (Yes in step S602), in step S604, it is determined whether the mouse signal is a click of the mid-button of the mouse. If not (No in step S604), in step S606, the position data corresponding to the movement trail of the mouse is received and recorded. It is understood that the movement trail is recognized to obtain a specific number. In step S608, it is determined whether the specific number corresponding to the movement trail conforms to any predefined number. It is noted that several predefined numbers can be set in the KVM switch, and each corresponds to one of the computer ports. For example, computer port 1 corresponds to "1", computer port 2 corresponds to "2", and the like. If not (No in step S608), the procedure returns to step S602. If so (Yes in step S608), in step S610, a flag is enabled, and in step S612, a timer is set. After the timer is set, it starts a count down. The timer is preset at a predefined time interval, and is used to determine whether two click signals compose a double click behavior. Then, the procedure returns to step S602.

If the mouse signal is a click of the mid-button of the mouse (Yes in step S604), in step S614, it is determined whether the click is a second click before time runs out of the timer. If not (No in step S614), in step S616, it is determined whether the flag is enabled. If not (No in step S616), in step S612, the timer is set, and the procedure returns to step S602. If so (Yes in step S616), the procedure returns to step S602. If the click is the second click before time runs out of the timer (Yes in step S614), in step S618, it is determined whether the time has run out. If so (Yes in step S618), in step S620, the timer is released. In step S622, the signal from the mid-button of the mouse is treated as a normal signal, and transmitted to the KVM switch, and the procedure returns to step S602. If time has not run out (No in step S618), in step S624, it is determined whether the flag is enabled. If not (No in step S624), in step S626, a next computer port subsequent to a current computer port among the computer ports in circular order is switched to, and in step S632, the timer is released. If the flag is enabled (Yes in step S624), in step S628, a specific computer port corresponding to the recognized specific number is switched to. For example, if the movement trail MT in FIG. 4 is recognized as "3", the KVM switch may switch the current computer port to the third computer port. Then, in step S630, the flag is disabled, and the procedure returns to step S602.

As described in the embodiment of FIG. 6, a movement trail may be recognized to obtain a specific number, and a specific computer port corresponding to the specific number may be switched to, in response to a double click or more click when the flag is enabled. However, in some embodiments, a specific computer port corresponding to the specific number may be directly switched to, after the movement trail of the mouse is detected.

Figure 7:
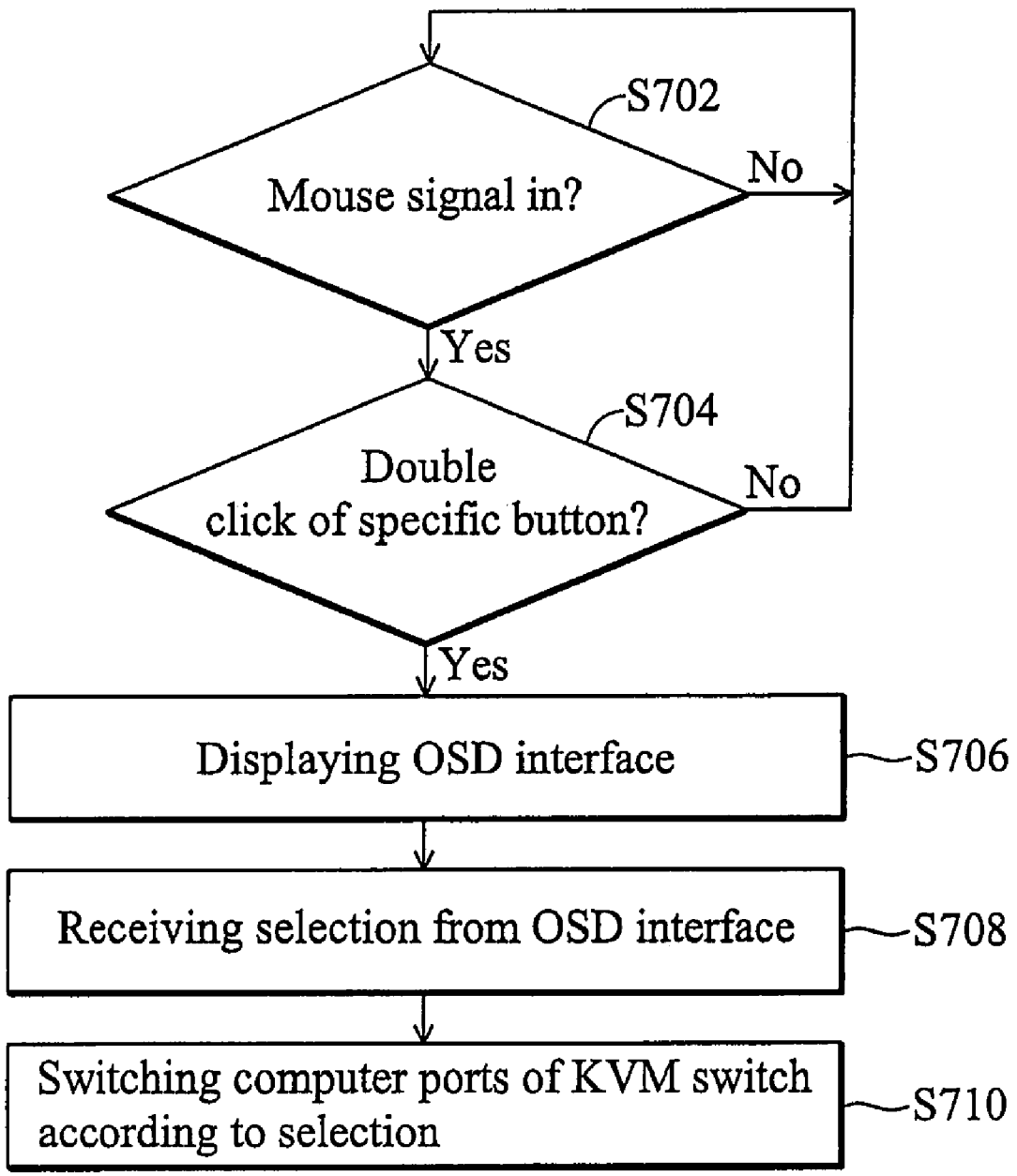
FIG. 7 is a flowchart of a method for switching of KVM switch ports according to an embodiment of the invention.

FIG. 7 is a flowchart of a method for switching KVM switch ports according to an embodiment of the invention. In this embodiment, the computer port switch can be performed via an OSD (On Screen Display) interface.

Figure 8:
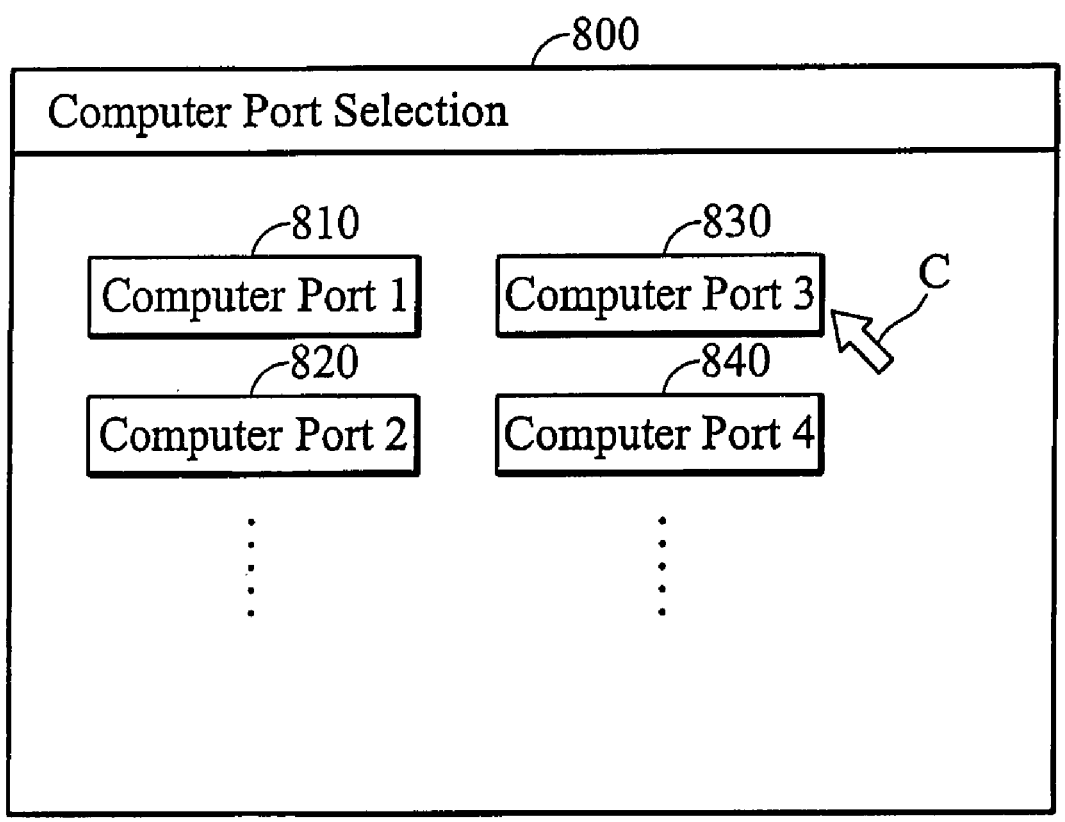
FIG. 8 is a schematic diagram illustrating an OSD interface for switching computer ports according to an embodiment of the invention.

In step S702, it is determined whether any mouse signal has been received. If not (No in step S702), the procedure remains at step S702. If so (Yes in step S702), in step S704, it is determined whether the received signals correspond to a double click of a specific button such as the mid-button of the mouse. Similarly, the double click of a specific button may be also replaced with multiple click such as triple or more click on the specific button, and the specific button may be also replaced with other button of the mouse, such as the left-button, the right-button of the mouse, or an extra button of the mouse other than the left-button, right-button and mid-button of the mouse. If not (No in step S704), the procedure returns to step S702. If so (Yes in step S704), in step S706, an OSD interface is displayed on the VGA monitor of the KVM switch. FIG. 8 is a schematic diagram illustrating an OSD interface for switching computer ports according to an embodiment of the invention. As shown in FIG. 8, the OSD interface 800 shows the computer port selections for switching. In this example, computer port selections port 1 (810), port 2 (820), port 3 (830), and port 4 (840) are provided in the OSD interface 800. Users can use the mouse or keyboard to move the cursor C to a specific computer port selection for switching. In step S708, a computer port selection is received via the OSD interface. In step S710, a specific computer port corresponding to the computer port selection is switched to, accordingly.

Methods for switching KVM switch ports and related devices, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide an unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for switching a keyboard-video-mouse (KVM) switch ports comprising a plurality of computer ports arranged in a circular order, comprising:
   detecting a behavior of a mouse coupled to the KVM switch, wherein the behavior comprises multiple click on a specific button of the mouse; and
   when the multiple click on the specific button of the mouse is detected, switching a current computer port among the computer ports to a next computer port among the computer ports, the next computer port being determined based on the current computer port according to the circular order regardless of a current location of the mouse.

2. The method of claim 1, wherein the behavior is detected by determining whether a first click signal and a second click signal corresponding to the multiple click are detected within a predefined time interval.

3. The method of claim 2, wherein the current computer port among the computer ports is switched to the next computer port among the computer ports subsequent thereto in the circular order when the first click signal and the second click signal corresponding to the multiple click are detected within the predefined time interval.

4. The method of claim 2, further comprising:
   determining whether a flag is enabled when the first click signal and the second click signal corresponding to the multiple click are detected within the predefined time interval; and
   if so, switching to a specific computer port among the computer ports.

5. The method of claim 4, wherein when a movement trail of the mouse is detected in the behavior, the flag is enabled, and the specific computer port among the computer ports corresponds to a specific number recognized according to the movement trail of the mouse.

6. The method of claim 4, wherein the current computer port among the computer ports is switched to the next computer port among the computer ports subsequent thereto in the circular order when the flag is disabled.

7. The method of claim 1, wherein the behavior comprises a movement trail of the mouse, and the method further comprises steps of:
   recognizing the movement trail of the mouse to obtain a specific number; and
   switching to a specific computer port among the computer ports corresponding to the specific number in response to the multiple click.

8. The method of claim 1, wherein the specific button is a mid-button of the mouse.

9. The method of claim 1, further comprising:
   displaying an OSD (On Screen Display) interface in response to the multiple click; and
   switching to a specific computer port among the computer ports via the OSD interface.

10. A keyboard-video-mouse (KVM) switch coupled with a mouse, comprising:
    a plurality of computer ports arranged in a circular order; and
    a processing module detecting a behavior of the mouse, wherein the behavior comprises multiple click on a specific button of the mouse, and when the multiple click on the specific button of the mouse is detected, switching a current computer port among the computer ports to a next computer port among the computer ports, the next computer port being determined based on the current computer port according to the circular order regardless of a current location of the mouse.

11. The KVM switch of claim 10, wherein the processing module detects the behavior by determining whether a first click signal and a second click signal corresponding to the multiple click are detected within a predefined time interval.

12. The KVM switch of claim 11, wherein the processing module switches the computer ports from the current computer port among the computer ports to the next computer port among the computer ports subsequent thereto in the circular order when the first click signal and the second click signal corresponding to the multiple click are detected within the predefined time interval.

13. The KVM switch of claim 11, wherein the processing module further determines whether a flag is enabled when the first click signal and the second click signal corresponding to the multiple click are detected within the predefined time interval, and if so, switches to a specific computer port among the computer ports.

14. The KVM switch of claim 13, wherein when a movement trail of the mouse is detected in the behavior, the flag is enabled, and the specific computer port among the computer ports corresponds to a specific number recognized according to the movement trail of the mouse.

15. The KVM switch of claim 13, wherein the processing module switches to the next computer port among the computer ports subsequent to the current computer port among the computer ports in the circular order when the flag is disabled.

16. The KVM switch of claim 10, wherein the behavior further comprises a movement trail of the mouse, and the processing module further recognizes the movement trail of the mouse to obtain a specific number, and switches to a specific computer port among the computer ports corresponding to the specific number in response to the multiple click.

17. The KVM switch of claim 10, wherein the specific button is a mid-button of the mouse.

18. The KVM switch of claim 10, wherein the processing module further displays an OSD (On Screen Display) interface in response to the multiple click, and switches to a specific computer port among the computer ports via the OSD interface.

19. A method for switching a keyboard-video-mouse (KVM) switch ports comprising a plurality of computer ports, comprising:
    detecting a behavior of a mouse coupled to the KVM switch, wherein the behavior comprises a movement trail of the mouse, and wherein the detecting of the behavior includes:
      recognizing a shape of the movement trail of the mouse to obtain a character; and
      determining whether the obtained character conforms to any one of a plurality of predefined characters, each of the plurality of predefined characters corresponding to one of a plurality of computer ports; and
    when the shape of the movement trail of the mouse is recognized and the one of the predefined characters is determined, switching the computer port to the computer port corresponding to the one of the predefined characters.

20. The method of claim 19,
    wherein the switching step includes switching to the computer port in response to receiving multiple click.

21. The method of claim 19, further comprising:
    displaying an OSD (On Screen Display) interface in response to the movement trail; and
    switching to the computer port via the OSD interface.

* * * * *